(12) United States Patent
Komatsu et al.

(10) Patent No.: US 11,648,852 B2
(45) Date of Patent: May 16, 2023

(54) VEHICLE

(71) Applicant: SUBARU CORPORATION, Tokyo (JP)

(72) Inventors: Yusuke Komatsu, Tokyo (JP); Masaru Oe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 78 days.

(21) Appl. No.: 17/481,954

(22) Filed: Sep. 22, 2021

(65) Prior Publication Data

US 2022/0097565 A1 Mar. 31, 2022

(30) Foreign Application Priority Data

Sep. 28, 2020 (JP) .............................. JP2020-162152

(51) Int. Cl.
*B60L 58/20* (2019.01)
*B60L 50/60* (2019.01)
*B60K 6/48* (2007.10)
*B60L 50/16* (2019.01)

(52) U.S. Cl.
CPC ................ *B60L 58/20* (2019.02); *B60K 6/48* (2013.01); *B60L 50/16* (2019.02); *B60L 50/60* (2019.02); *B60K 2006/4808* (2013.01); *B60L 2210/10* (2013.01); *B60L 2240/547* (2013.01)

(58) Field of Classification Search
CPC .......... B60L 58/20; B60L 50/60; B60L 50/16; B60L 2210/10
USPC ......................................................... 307/9.1
See application file for complete search history.

(56) References Cited

U.S. PATENT DOCUMENTS

2007/0210743 A1\* 9/2007 Tabei ...................... B60L 58/20
320/104
2019/0054871 A1 2/2019 Taniguchi et al.

FOREIGN PATENT DOCUMENTS

JP 2017-166434 A 9/2017

\* cited by examiner

*Primary Examiner* — Daniel Kessie
*Assistant Examiner* — Dru Parries
(74) *Attorney, Agent, or Firm* — McDermott Will & Emery LLP

(57) ABSTRACT

A vehicle includes a high-voltage system circuit including a high-voltage battery; a low-voltage system circuit including a low-voltage battery and an updater; a DC-DC converter coupled between the two circuits; and a controller that controls the two circuits and the DC-DC converter. The updater updates a program of an update-target device. The DC-DC converter reduces in voltage output electric power of the high-voltage battery and then supplies the electric power to the low-voltage system circuit. The controller determines whether the update-target device is a certain device relating to electric power supply from the high-voltage battery. If the update-target device is the certain device, the low-voltage battery is charged with the output electric power of the high-voltage battery, the certain device stops operating, and the updater updates the program of the certain device by using the output electric power of the low-voltage battery.

8 Claims, 6 Drawing Sheets

VEHICLE

CROSS-REFERENCE TO RELATED APPLICATIONS

The present application claims priority from Japanese Patent Application No. 2020-162152 filed on Sep. 28, 2020, the entire contents of which are hereby incorporated by reference.

BACKGROUND

The disclosure relates to a vehicle.

In recent years, there has been proposed a technique for updating a program of an electronic control unit that controls an engine, a motor, and other vehicle-mounted devices installed in a vehicle. Hereinafter, updating a program is also referred to as reprogramming.

Reprogramming is commonly performed when a vehicle and an engine are stopped. Thus, reprogramming is performed by using electric power stored in a battery such as a 12V accessory battery (low-voltage battery) (see, for example, Japanese Unexamined Patent Application Publication No. 2017-166434).

SUMMARY

An aspect of the disclosure provides a vehicle including a high-voltage system circuit, a low-voltage system circuit, a direct current (DC)-DC converter, and a controller. The high-voltage system circuit includes a high-voltage battery. The low-voltage system circuit includes a low-voltage battery and an updater. The low-voltage battery has a lower output voltage than the high-voltage battery. The updater is configured to update a program of an update-target device by using electric power supplied from the low-voltage battery or the high-voltage battery. The DC-DC converter is coupled between the high-voltage system circuit and the low-voltage system circuit and is capable of reducing in voltage output electric power of the high-voltage battery and supplying the electric power reduced in voltage to the low-voltage system circuit. The controller is configured to control the high-voltage system circuit, the low-voltage system circuit, and the DC-DC converter. The controller is configured to determine whether the update-target device is a certain device relating to electric power supply from the high-voltage battery to the low-voltage system circuit. In a case where the update-target device is the certain device, the controller is configured to cause the DC-DC converter to reduce the output electric power of the high-voltage battery and to supply the reduced electric power to the low-voltage system circuit so as to charge the low-voltage battery, configured to cause the certain device to stop operating after the low-voltage battery is charged, and configured to cause the updater to update the program of the certain device by using the output electric power of the low-voltage battery.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In recent years, time taken for reprogramming tends to increase because of an increase in a program capacity or the like. If the time taken for reprogramming increases, electric power used for reprogramming increases. Thus, if electric power is not sufficiently stored in a battery at the time of reprogramming, updating of a program may be aborted because of a deficiency of electric power.

Accordingly, when a charge level of a 12V accessory battery (low-voltage battery) is deficient, reprogramming is conceivably performed by reducing output electric power of a high-voltage battery for driving a motor used by a vehicle to travel and by using the reduced electric power as electric power for reprogramming. However, there is room for improvement of the method of using, as the electric power for reprogramming, the electric power supplied from the high-voltage battery instead of the 12V accessory battery in that it is difficult to perform reprogramming of a device relating to electric power supply from the high-voltage battery to a low-voltage system circuit.

Accordingly, it is desirable to provide a vehicle capable of reducing the likelihood of updating of a program being aborted because of a deficiency of electric power and capable of performing reprogramming of a device relating to electric power supply from a high-voltage battery to a low-voltage system circuit.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
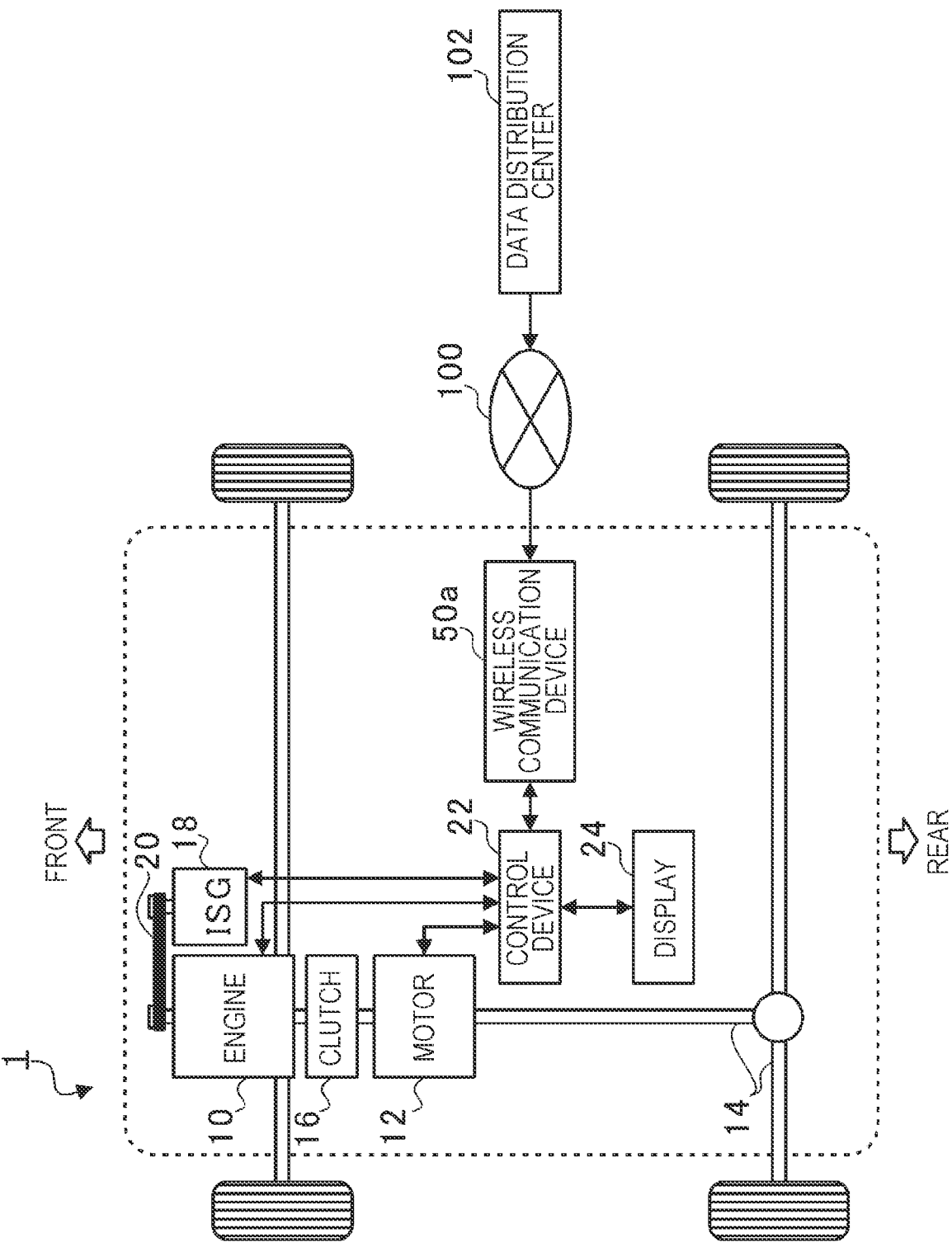
FIG. 1 is a functional block diagram for describing a vehicle in accordance with an embodiment.

FIG. 1 is a functional block diagram for describing a vehicle 1 in accordance with an embodiment. The vehicle 1 including an engine 10 and a motor 12 as driving sources for traveling is presented as an example. The vehicle 1 according to the embodiment is, for example, a so-called parallel hybrid vehicle. The engine 10 is mainly used as a motive power source to cause an output shaft 14 to rotate. The motor 12, which is a three-phase alternating current (AC) motor, is also a motive power source but merely plays a role of assisting the engine 10. A drive mode in which the engine 10 and the motor 12 are jointly used is referred to as a joint use mode.

At the time of low-speed traveling in which the speed of the engine 10 is low such as at the time when the vehicle 1 starts traveling or starts accelerating, power or torque of the engine 10 is small. Thus, a clutch 16 is released, and the drive mode is switched from the joint use mode to an electric vehicle (EV) mode in which the motor 12 alone is used as the motive power source. The drive mode is switchable from the joint use mode to the EV mode in accordance with a traveling state at the times other than the time when the vehicle 1 starts traveling or starts accelerating.

An endless member such as a belt 20 extends around an integrated starter generator (ISG) 18 and the output shaft 14 of the engine 10, so that the ISG 18 is coupled to the engine 10. Consequently, the ISG 18 functions as a starter motor that transfers motive power to the engine 10 to assist the engine 10 in starting. The ISG 18 also functions as an alternator that regenerates electric power. Conceivable timings when the engine 10 is started include not only a timing when the vehicle 1 starts traveling but also various timings such as a timing when the drive mode is switched from the EV mode to the joint use mode and a timing when the engine 10 in a non-idling state is restarted.

A control device 22 includes, for example, semiconductor integrated circuits including a central processing unit (CPU), a read-only memory (ROM) that stores a program or the like, and a random access memory (RAM) that serves as a work area. The control device 22 controls the entire vehicle 1 or various devices installed in the vehicle 1. For example, the control device 22 controls each component of an electric/electronic system circuit that includes a high-voltage battery 32 (see FIG. 2) and a low-voltage battery 42 (see FIG. 2), which will be described later.

The control device 22 is coupled to a wireless communication device 50a (see also FIG. 2) and is capable of transmitting and receiving various kinds of data to and from an external device via the wireless communication device 50a. The wireless communication device 50a is capable of wirelessly communicating with a data distribution center 102 via a network 100. The data distribution center 102 has a function of distributing reprogramming information for use in updating of a program for controlling an update-target device 44 (see FIG. 2 described later) installed in the vehicle 1. The reprogramming information includes, for example, information for designating the update-target device 44 for which reprogramming is performed, and information on update data for use in reprogramming.

The control device 22 includes an automotive navigation system controller 52a (see FIG. 2) described later. The automotive navigation system controller 52a enables various kinds of information such as map information to be displayed on a display 24 coupled to the control device 22.

Figure 2:
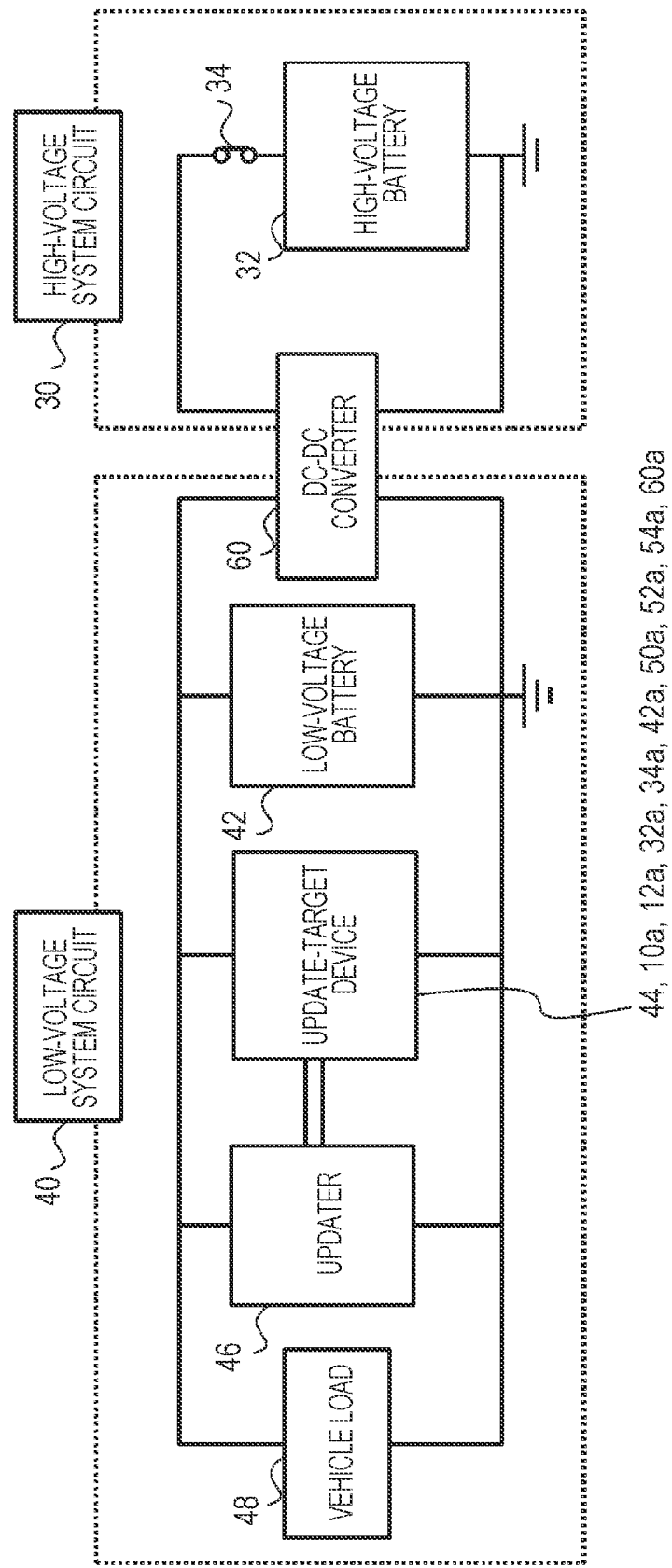
FIG. 2 is a block diagram illustrating an electric/electronic system circuit that is controlled by a control device in accordance with the embodiment.

FIG. 2 is a block diagram illustrating the electric/electronic system circuit that is controlled by the control device 22 in accordance with the embodiment. As illustrated in FIG. 2, the electric/electronic system circuit installed in the vehicle 1 includes a high-voltage system circuit 30, a low-voltage system circuit 40, and a direct current (DC)-DC converter 60. The high-voltage system circuit 30 includes the high-voltage battery 32 and a high-voltage relay 34. The high-voltage relay 34 is a relay device that switches on and off the electrical coupling of the high-voltage battery 32 in the high-voltage system circuit 30.

The low-voltage system circuit 40 includes the low-voltage battery 42, the update-target device 44, an updater 46, and a vehicle load 48. The low-voltage battery 42 is a rechargeable battery having a lower output voltage than the high-voltage battery 32. The low-voltage battery 42 is, for example, a 12V accessory battery and supplies relatively-low-voltage (for example, 12V) DC electric power to various vehicle-mounted devices (accessories) installed in the vehicle 1. The updater is a program updating tool that performs updating of a program (reprogramming) of the update-target device 44 in accordance with an instruction of the control device 22. The updater 46 performs reprogramming of the update-target device by using electric power supplied from the low-voltage battery 42 or the high-voltage battery 32. Examples of the vehicle load 48 include electrical loads such as a door-mirror motor (not illustrated), a power-window motor (not illustrated), and a radiator-fan motor (not illustrated), for example.

In one example, the update-target device 44 is, for example, an engine controller 10a, a motor controller 12a, a high-voltage battery controller 32a, a high-voltage relay controller 34a, a low-voltage battery controller 42a, the wireless communication device 50a, the automotive navigation system controller 52a, an ignition power supply (IG power supply) controller 54a, or a DC-DC converter controller 60a. The engine controller 10a controls the engine 10. The motor controller 12a controls the motor 12. The high-voltage battery controller 32a controls the high-voltage battery 32. The high-voltage relay controller 34a controls the high-voltage relay 34. The low-voltage battery controller 42a controls the low-voltage battery 42. The wireless communication device 50a wirelessly communicates with the data distribution center 102 via the network 100. The automotive navigation system controller 52a controls an automotive navigation system. The IG power supply controller 54a controls an IG power supply of the vehicle 1 to be in an IG-ON (READY-ON) or IG-OFF (READY-OFF) state on the basis of a user operation. The DC-DC converter controller 60a controls operation of the DC-DC converter 60.

The DC-DC converter 60 is coupled between the high-voltage system circuit 30 and the low-voltage system circuit 40. The DC-DC converter 60 is capable of reducing in voltage output electric power of the high-voltage battery 32 of the high-voltage system circuit 30 and of supplying the electric power reduced in voltage to the low-voltage battery 42, the update-target device 44, the updater 46, the vehicle load 48, etc. of the low-voltage system circuit 40. That is, the DC-DC converter 60 can reduce a voltage of output electric power of the high-voltage battery 32 of the high-voltage system circuit 30 and supply the electric power with reduced voltage to the low-voltage battery 42, the update-target device 44, the updater 46, the vehicle load 48, etc. of the low-voltage system circuit 40.

The high-voltage battery controller 32a sets a target state-of-charge (SOC) range, that is, an upper-limit value and a lower-limit value, for the high-voltage battery 32, and controls charging and discharging of the high-voltage battery 32 in accordance with this target SOC range.

Figure 3A:
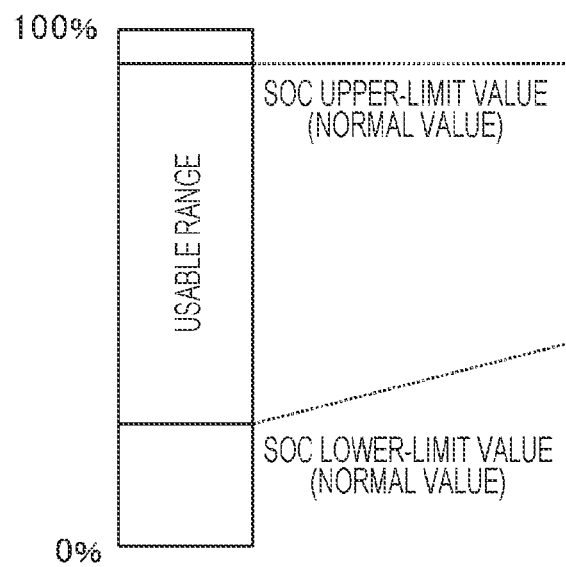
FIGS. 3A and 3B are diagrams for describing how a target state of charge (SOC) of a high-voltage battery is controlled by a high-voltage battery controller in accordance with the embodiment.
Figure 3B:
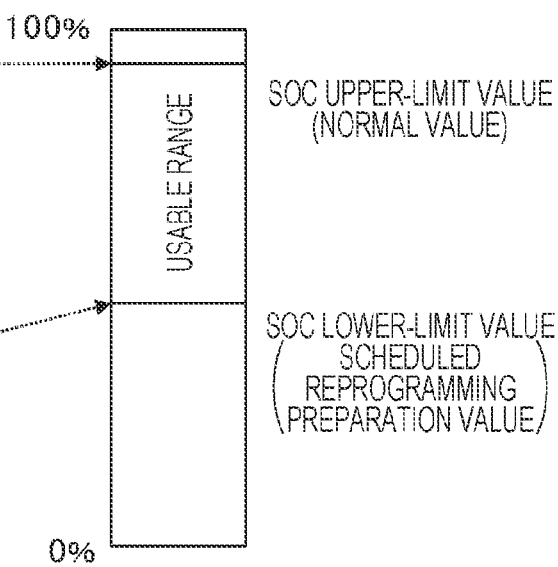

FIGS. 3A and 3B are diagrams for describing how the target SOC of the high-voltage battery 32 is controlled by the high-voltage battery controller 32a. As illustrated in FIG. 3A, at normal time when no reprogramming is scheduled, the high-voltage battery controller 32a sets, as the target SOC range, a normal SOC upper-limit value and a normal SOC lower-limit value. For example, the normal SOC upper-limit value may be set to 90% of the fully charged state of the high-voltage battery 32 which is represented as 100%. For example, the normal SOC lower-limit value may be set to 50% of the fully charged state of the high-voltage battery 32 which is represented as 100%. The normal SOC upper-limit and lower-limit values are not limited to these specific examples.

In response to the wireless communication device 50a receiving reprogramming information from the data distribution center 102 via the network 100 and reprogramming being scheduled, the high-voltage battery controller 32a changes the target SOC lower-limit value of the high-voltage battery 32 to a value (scheduled reprogramming preparation value) that is higher than the normal lower-limit value (normal SOC lower-limit value). The high-voltage battery controller 32a sets the SOC upper-limit value to the normal SOC upper-limit value.

In one example, when the wireless communication device 50a receives reprogramming information from the data distribution center 102 via the network 100, the high-voltage battery controller 32a determines that reprogramming is scheduled. The high-voltage battery controller 32a calculates electric power used for reprogramming of the update-target device 44 (hereinafter, also referred to as "electric power for reprogramming") on the basis of the received reprogramming information.

In one example, the reprogramming information includes various kinds of information such as a program capacity for the update-target device 44, a write speed of writing the update program to the update-target device 44, electric power consumption per unit time during reprogramming, and a communication speed between the updater 46 and the update-target device 44, for example. The high-voltage battery controller 32a calculates the electric power for reprogramming on the basis of all or some of these various kinds of information.

On the basis of the calculated electric power for reprogramming, the high-voltage battery controller 32a changes the target SOC lower-limit value of the high-voltage battery 32 to the scheduled reprogramming preparation value that is higher than the normal value. For example, the high-voltage battery controller 32a sets the target SOC lower-limit value of the high-voltage battery 32 to the scheduled reprogramming preparation value (for example, 70% of the fully charged state) that is higher than the normal value (for example, 50% of the fully charged state). In some embodiments, the target SOC lower-limit value (scheduled reprogramming preparation value) is set to a larger value as the calculated electric power for reprogramming becomes larger. Consequently, the high-voltage battery 32 is sufficiently charged and a charge level higher than or equal to the electric power for reprogramming can be ensured. Thus, a deficiency of electric power during reprogramming is successfully avoided.

In the embodiment, the high-voltage battery controller 32a calculates the electric power for reprogramming of the update-target device 44 on the basis of the reprogramming information. The high-voltage battery controller 32a changes the target SOC lower-limit value of the high-voltage battery 32 on the basis of the calculated electric power for reprogramming. However, the embodiment of the disclosure is not limited to this. For example, in response to the wireless communication device 50a receiving reprogramming information from the data distribution center 102 via the network 100 and reprogramming being scheduled, the high-voltage battery controller 32a may set a predetermined SOC lower-limit value as the target SOC lower-limit value (scheduled reprogramming preparation value) of the high-voltage battery 32. For example, the SOC lower-limit value serving as the scheduled reprogramming preparation value may be set in advance to 70% of the fully charged state of the high-voltage battery 32 which is represented as 100%.

Alternatively, the reprogramming information may include electric power information on the electric power used for reprogramming of the update-target device 44. In this case, the high-voltage battery controller 32a changes the target SOC lower-limit value of the high-voltage battery 32 on the basis of the electric power information.

The high-voltage battery controller 32a then changes the target SOC lower-limit value of the high-voltage battery 32 to the scheduled reprogramming preparation value. The high-voltage battery 32 is charged to a charge level that is higher than or equal to the scheduled reprogramming preparation value. In response to a user operation (IG-OFF operation) for setting the vehicle 1 to READY-OFF performed in a state in which reprogramming is scheduled, the updater 46 checks the charge levels of the high-voltage battery 32 and the low-voltage battery 42.

Figure 4:
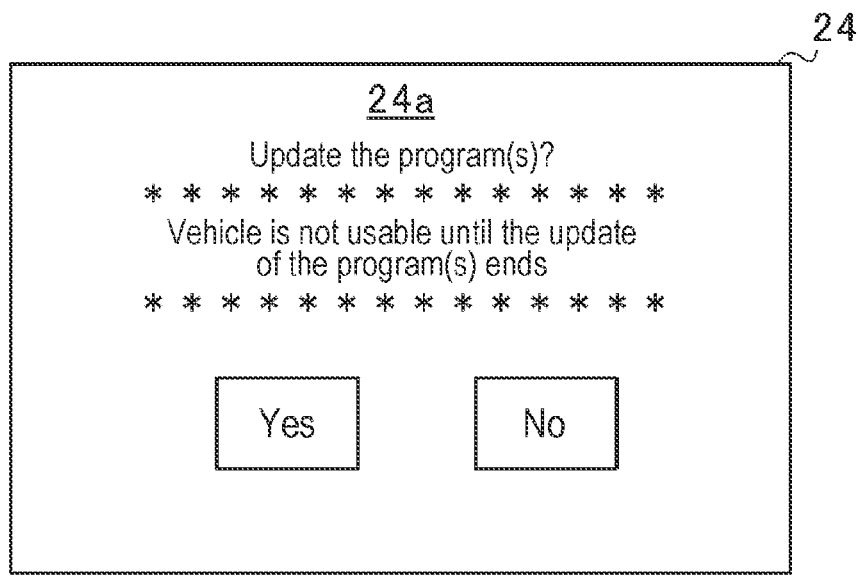
FIG. 4 is a diagram illustrating a reprogramming confirmation screen in accordance with the embodiment.

FIG. 4 is a diagram illustrating a reprogramming confirmation screen 24a in accordance with the embodiment. If the charge level of the low-voltage battery 42 is higher than or equal to the electric power level used for reprogramming of the update-target device 44 and thus reprogramming of the update-target device 44 can be performed by using the low-voltage battery 42, or if the charge level of the high-voltage battery 32 is higher than or equal to the scheduled reprogramming preparation value, the automotive navigation system controller 52a causes the reprogramming confirmation screen 24a to be displayed on the display 24 as illustrated in FIG. 4. The reprogramming confirmation screen 24a asks for the user's confirmation to perform reprogramming.

In the reprogramming confirmation screen 24a, for example, a warning message "Once reprogramming starts, the vehicle 1 is not usable until reprogramming ends" and button images that allow the user to select whether to confirm reprogramming (Yes or No) are displayed.

If the user presses the "Yes" button in the reprogramming confirmation screen 24a to confirm reprogramming, a reprogramming operation starts. On the other hand, if the user presses the "No" button in the reprogramming confirmation screen 24a to reject reprogramming or if neither the "Yes" button nor the "No" button is pressed by the user in the reprogramming confirmation screen 24a, the reprogramming operation does not start.

In response to the start of the reprogramming operation, the updater 46 performs reprogramming of the update-target device 44 by using electric power of the low-voltage battery 42 if reprogramming of the update-target device 44 can be performed by using the low-voltage battery 42.

On the other hand, if the charge level of the low-voltage battery 42 is not sufficient and thus reprogramming of the update-target device 44 is unable to be performed by using the low-voltage battery 42, in order to perform reprogramming by using the high-voltage battery 32, the high-voltage relay controller 34a brings the high-voltage relay 34 into a coupled state to enable electric power of the high-voltage battery 32 to be output to the DC-DC converter 60. The DC-DC converter controller 60a causes the DC-DC converter 60 to start operating, to reduce in voltage electric power output from the high-voltage battery 32, and to supply the electric power reduced in voltage to the low-voltage system circuit 40.

At this time, the updater 46 determines whether the update-target device 44 subjected to reprogramming is a certain device used for supplying electric power from the high-voltage battery 32. Examples of such a certain device include the high-voltage battery controller 32a, the DC-DC converter controller 60a, and the high-voltage relay controller 34a, for example.

If the update-target device 44 subjected to reprogramming is not the certain device used for supplying electric power from the high-voltage battery 32, the updater 46 performs reprogramming of the update-target device 44 by using electric power supplied from the high-voltage battery 32 to the low-voltage system circuit 40. In response to the end of reprogramming, the DC-DC converter controller 60a causes the DC-DC converter 60 to stop operating and the high-voltage relay controller 34a breaks the coupling of the high-voltage relay 34.

If the update-target device 44 subjected to reprogramming is the certain device used for supplying electric power from the high-voltage battery 32, reprogramming of the update-target device 44 by the updater 46 is not performed in a state in which the low-voltage system circuit 40 is being supplied with electric power from the high-voltage battery 32. Thus, in the embodiment, the update-target device 44 (certain device) or the like is temporarily used to supply electric power to the low-voltage battery 42 from the high-voltage battery 32 through the DC-DC converter 60 and to sufficiently charge the low-voltage battery 42. After charging of the low-voltage battery 42 ends, electric power supply from the high-voltage battery 32 is stopped and the update-target device 44 (certain device) is caused to stop operating. Then, the updater 46 performs reprogramming of the update-target device 44 (certain device) by using electric power supplied from the low-voltage battery 42.

In one example, the low-voltage battery controller 42a charges the low-voltage battery 42 until the charge level of the low-voltage battery 42 becomes equal to a level with which reprogramming of the update-target device 44 can be performed by using the low-voltage battery 42. At this time, the low-voltage battery controller 42a can determine the charge level of the low-voltage battery 42 on the basis of the electric power used for reprogramming of the update-target device 44 which is calculated by the high-voltage battery controller 32a. The configuration is not limited to such an example. The low-voltage battery controller 42a may charge the low-voltage battery 42 to a predetermined charge level set in advance. For example, this predetermined charge level may be set in advance to 90% of the fully charged state of the low-voltage battery 42 which is represented as 100%.

In response to the completion of charging of the low-voltage battery 42, the DC-DC converter controller 60a ends the operation of the DC-DC converter 60 and the high-voltage relay controller 34a breaks the coupling of the high-voltage relay 34. Then, the updater 46 performs reprogramming of the update-target device 44 by using electric power of the low-voltage battery 42 that has been charged.

Control Method

Figure 5A:
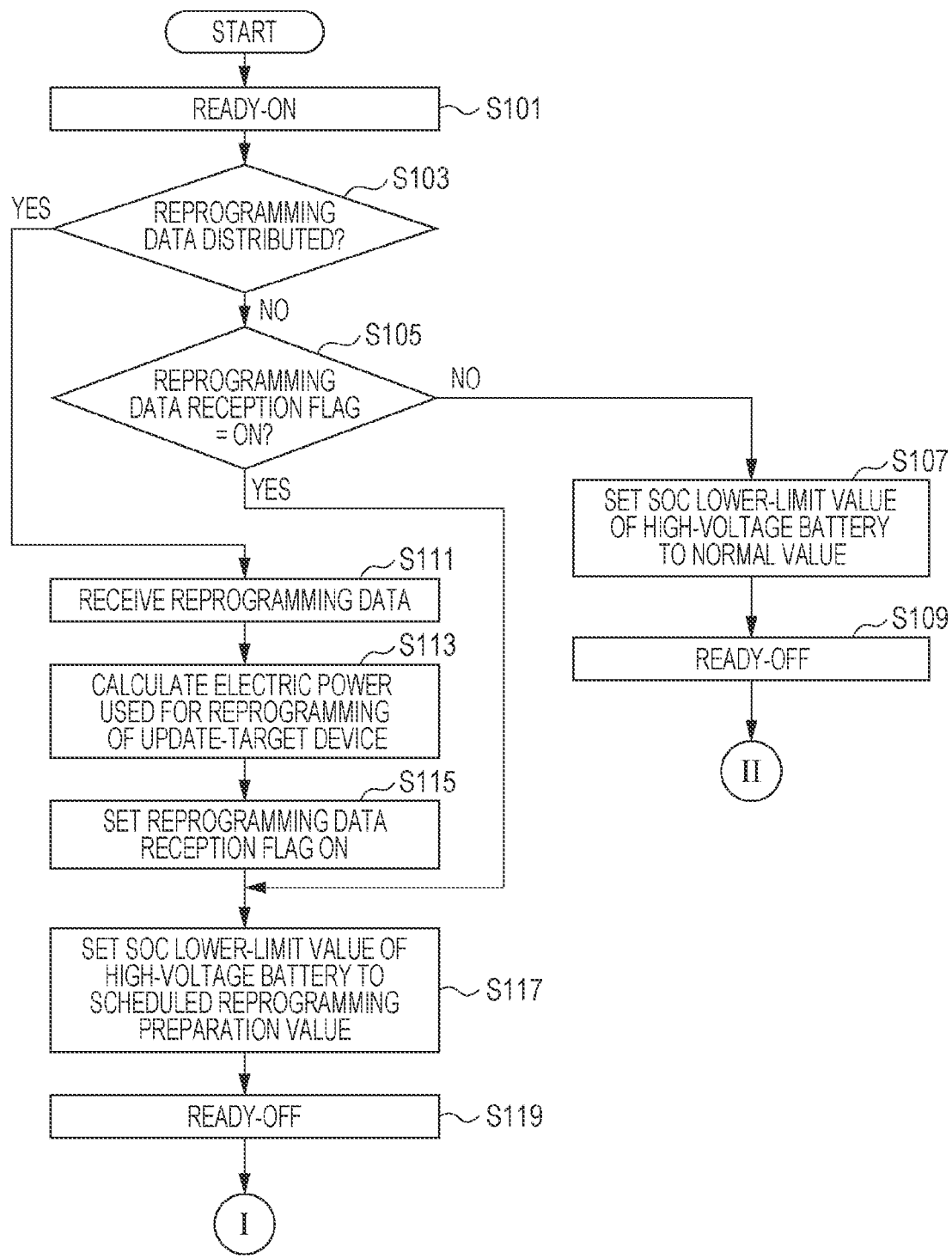
FIGS. 5A and 5B are flowcharts for describing a control process performed in relation to reprogramming in the vehicle in accordance with the embodiment.
Figure 5B:
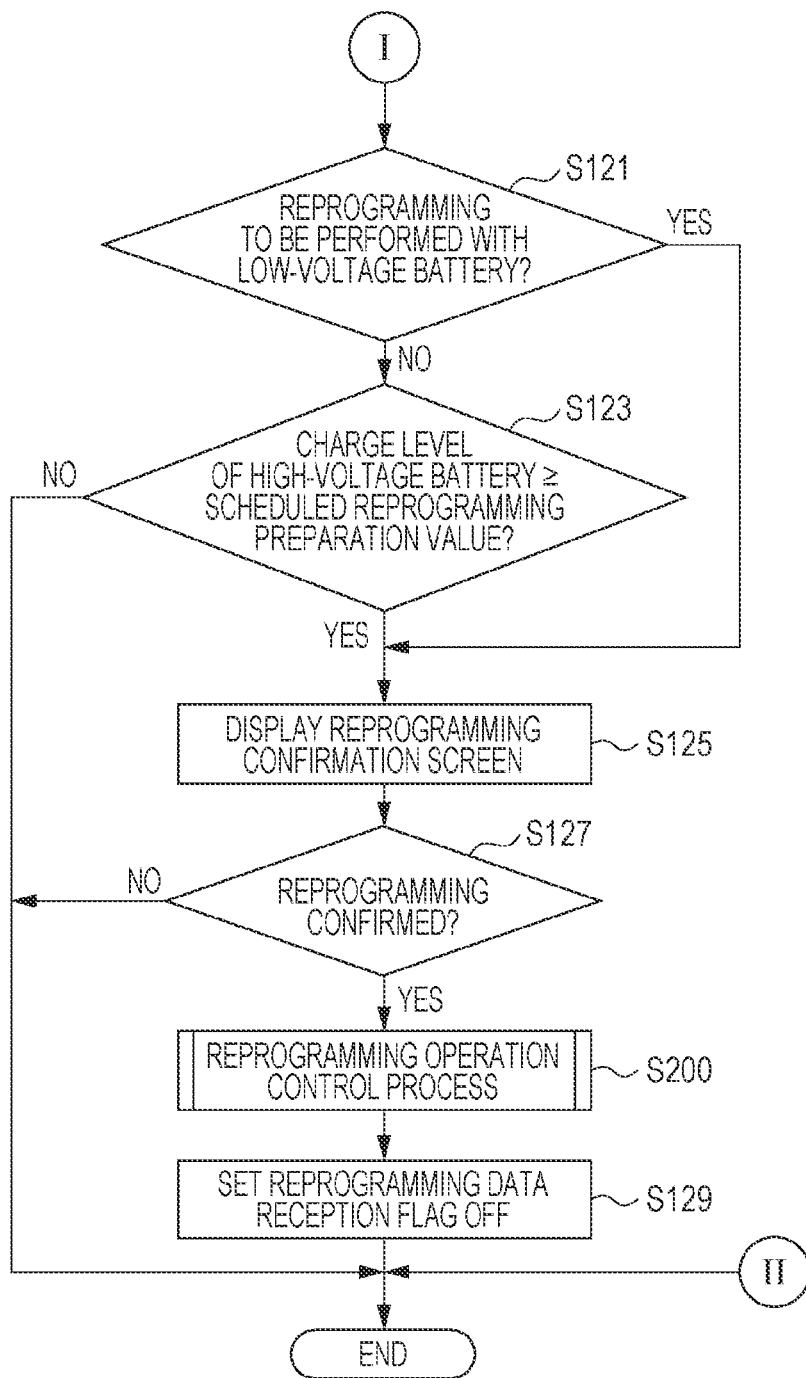

FIGS. 5A and 5B are flowcharts for describing a control process performed in relation to reprogramming in the vehicle 1 in accordance with the embodiment.

As illustrated in FIG. 5A, in response to a user operation, the IG power supply controller 54a of the control device 22 switches on the IG power supply and controls the vehicle 1 to be in the READY-ON (IG-ON) state (step S101).

The control device 22 wirelessly communicates with the data distribution center 102 via the wireless communication device 50a and checks whether reprogramming data yet to be received by the vehicle 1 of interest is present in reprogramming data distributed from the data distribution center 102 (step S103). The reprogramming data is data including update data for updating a program of the update-target device 44. The data distribution center 102 distributes reprogramming information including the reprogramming data for performing reprogramming to each vehicle 1 via the network 100 when it is desirable to perform reprogramming of the update-target device 44.

If it is determined in S103 that yet-to-be-received reprogramming data is not present (NO in step S103), the high-voltage battery controller 32a of the control device 22 determines whether a reprogramming data reception flag is on (step S105). If the reprogramming data reception flag is on, the vehicle 1 of interest has already received reprogramming data but reprogramming is yet to be performed in accordance with the reprogramming data. Thus, the reprogramming data reception flag indicates a state in which reprogramming is to be performed (reprogramming is scheduled).

If it is determined in S105 that the reprogramming data reception flag is off (NO in step S105), reprogramming is not to be performed. Thus, the high-voltage battery controller 32a sets the SOC lower-limit and upper-limit values of the high-voltage battery 32 to the normal values (step S107). As a result of this, the high-voltage battery 32 is charged, for example, during traveling of the vehicle 1 thereafter within the normal target SOC range (see FIG. 3A).

The IG power supply controller 54a of the control device 22 then controls the vehicle 1 to be in the READY-OFF (IG-OFF) state in response to a user operation (step S109). The control process then ends.

On the other hand, if it is determined in step S105 that the reprogramming data reception flag is on (YES in step S105), the process proceeds to S117 (described below).

If it is determined in step S103 that the yet-to-be-received reprogramming data is present and the reprogramming data is to be received from the data distribution center 102 (YES in step S103), the control device 22 receives reprogramming information including the reprogramming data from the data distribution center 102 via the network 100 and the wireless communication device 50a (step S111).

The high-voltage battery controller 32a of the control device 22 calculates electric power used for reprogramming of the update-target device 44 on the basis of the reprogramming information received from the data distribution center 102 (step S113), and sets the reprogramming data reception flag on (step S115). That is, in response to the wireless communication device 50a receiving the reprogramming data, the reprogramming data reception flag is set on and reprogramming is scheduled. The reprogramming data reception flag is not set off until reprogramming is completed.

If it is determined in step S105 that the reprogramming data reception flag is on (YES in step S105) or if the reprogramming data reception flag is set on in step S115, the high-voltage battery controller 32a of the control device 22 determines that reprogramming is scheduled. The high-voltage battery controller 32a of the control device 22 then changes the set target SOC lower-limit value of the high-voltage battery 32 to the scheduled reprogramming preparation value that is higher than the normal value on the basis of the calculated electric power used for reprogramming of the update-target device 44 and sets the SOC upper-limit value to the normal value (step S117). As a result of this, the high-voltage battery 32 is charged, for example, during traveling of the vehicle 1 thereafter within a special target SOC range set when reprogramming is scheduled (see FIG. 3B).

For example, in the case where the vehicle 1 stops thereafter, the IG power supply controller 54a of the control device 22 controls the vehicle 1 to be in the READY-OFF (IG-OFF) state in response to a user operation (step S119).

The control device 22 checks the charge level of the low-voltage battery 42 and determines whether the charge level of the low-voltage battery 42 is higher than or equal to the electric power level used for reprogramming of the update-target device 44, that is, whether reprogramming can be performed by using the low-voltage battery 42 (step S121).

If it is determined that reprogramming is not to be performed by using the low-voltage battery 42 (NO in step S121), the control device 22 checks the charge level of the high-voltage battery 32 and determines whether the charge level (actual SOC) of the high-voltage battery 32 is higher than or equal to the scheduled reprogramming preparation value (target SOC lower-limit value) (step S123).

If it is determined that the charge level of the high-voltage battery 32 is higher than or equal to the scheduled reprogramming preparation value (YES in step S123) or if it is determined that reprogramming can be performed by using the low-voltage battery 42 (YES in step S121), the automotive navigation system controller 52a of the control device 22 causes the reprogramming confirmation screen 24a (see FIG. 4) to be displayed on the display 24 (step S125).

The control device 22 then determines whether the "Yes" button is operated by the user in the reprogramming confirmation screen 24a (step S127). If it is determined that the "Yes" button is operated in the reprogramming confirmation screen 24a and reprogramming is confirmed by the user (YES in step S127), the control device 22 performs a reprogramming operation control process (step S200) by using the updater 46. The reprogramming operation control process (step S200) will be described later. In response to the end of the reprogramming operation control process (step S200), the control device 22 sets the reprogramming data reception flag off. The process then ends.

On the other hand, if the "No" button is operated in the reprogramming confirmation screen 24a in step S127 or if neither the "Yes" button nor the "No" button is operated by the user in the reprogramming confirmation screen 24a (NO in step S127), the control device 22 ends the process without performing the reprogramming operation. If it is determined in step S123 that the charge level of the high-voltage battery 32 is lower than the scheduled reprogramming preparation value (NO in step S123), the control device 22 ends the process without performing the reprogramming operation.

Reprogramming Operation Control Process

Figure 6:
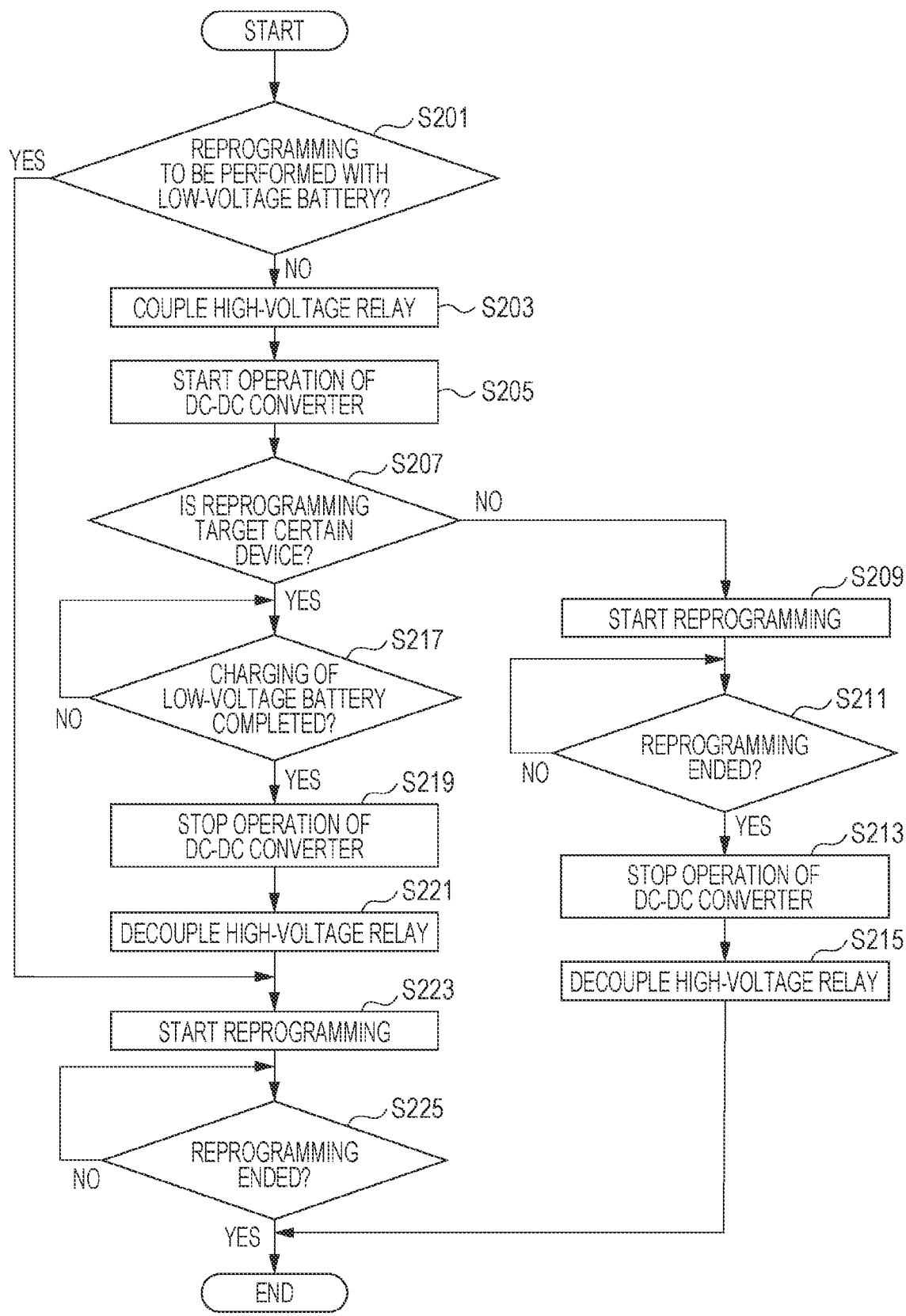
FIG. 6 is a flowchart for describing a reprogramming operation control process performed in the vehicle in accordance with the embodiment.

FIG. 6 is a flowchart for describing the reprogramming operation control process (step S200 in FIG. 5B) performed in the vehicle 1 in accordance with the embodiment.

As illustrated in FIG. 6, the control device 22 first checks the charge level of the low-voltage battery 42 and determines whether the charge level of the low-voltage battery 42 is higher than or equal to the electric power level used for reprogramming of the update-target device 44, that is, whether reprogramming can be performed by using the low-voltage battery 42 (step S201).

If it is determined that reprogramming is not to be performed by using the low-voltage battery 42 (NO in step S201), the high-voltage relay controller 34a of the control device 22 brings the high-voltage relay 34 into a coupled state (step S203). The DC-DC converter controller 60a causes the DC-DC converter 60 to start operating, to reduce in voltage the electric power output from the high-voltage battery 32, and to supply the electric power reduced in voltage to the low-voltage system circuit 40 (step S205). As a result of this, the low-voltage battery 42 can be charged by using electric power supplied from the high-voltage battery 32. Further, in the low-voltage system circuit 40, reprogramming of the update-target device 44 can be performed by using electric power supplied from the high-voltage battery 32.

The control device 22 determines whether the update-target device 44 subjected to reprogramming is a certain device used for supplying electric power from the high-voltage battery 32 (step S207). In one example, such a certain device is, for example, the high-voltage battery controller 32a, the DC-DC converter controller 60a, or the like as described above.

If it is determined that the update-target device 44 subjected to reprogramming is not the certain device used for supplying electric power from the high-voltage battery 32, the control device 22 instructs the updater 46 to perform reprogramming. The updater 46 starts reprogramming of the update-target device 44 by using the electric power supplied from the high-voltage battery 32 (step S209). In response to the end of reprogramming (YES in step S211), the DC-DC converter controller 60a causes the DC-DC converter 60 to stop operating (step S213) and the high-voltage relay controller 34a breaks the coupling of the high-voltage relay 34 (step S215). The process then ends.

On the other hand, if the update-target device 44 subjected to reprogramming is the certain device used for supplying electric power from the high-voltage battery 32 (YES in step S207), the low-voltage battery controller 42a of the control device 22 determines whether charging of the low-voltage battery 42 is completed by using electric power output from the high-voltage battery 32 (step S217). In one example, the low-voltage battery controller 42a determines whether the charge level of the low-voltage battery 42 is higher than or equal to the charge level determined on the basis of the electric power for reprogramming of the update-target device 44 calculated by the high-voltage battery controller 32a.

If it is determined that charging of the low-voltage battery 42 is completed (YES in step S217), the DC-DC converter controller 60a of the control device 22 causes the DC-DC converter 60 to stop operating (step S219) and the high-voltage relay controller 34a breaks the coupling of the high-voltage relay 34 (step S221).

After the coupling of the high-voltage relay 34 is broken in step S221 or if it is determined in step S201 that reprogramming can be performed by using the low-voltage battery 42 (YES in step S201), the control device 22 instructs the updater 46 to perform reprogramming. The updater 46 performs reprogramming of the update-target device 44 by using electric power supplied from the low-voltage battery 42 (step S223). If reprogramming ends (YES in step S225), the process ends.

The control method of the reprogramming process performed in the vehicle 1 according to the embodiment has been described above. The embodiment provides the following beneficial effects.

In the related art, electric power used when reprogramming is performed is commonly supplied by the low-voltage battery 42. However, for example, when the SOC of the low-voltage battery is low, electric power used for reprogramming may be deficient. If reprogramming is aborted because of a deficiency of electric power, this may adversely affect the normal operation of the vehicle 1, which may lead to replacement of the update-target device 44 subjected to reprogramming according to circumstances.

On the other hand, in the case where reprogramming data is received via wireless communication and reprogramming is performed on the basis of the received reprogramming data, if the vehicle 1 is coupled to an external power supply with a cable, the convenience is reduced. Thus, it is not desirable to supply electric power from an external power supply when reprogramming is performed.

Accordingly, it is conceivable to reduce in voltage the output power of the high-voltage battery 32 and use the output power reduced in voltage in reprogramming when electric power of the low-voltage battery 42 used in reprogramming is deficient in an electric-powered vehicle equipped with the high-voltage battery 32 for driving the motor. However, in such a case, it is difficult to perform reprogramming of a certain device relating to electric power supply from the high-voltage battery 32 to the low-voltage system circuit 40.

Accordingly, in the present embodiment, it is determined whether the update-target device 44 is a certain device relating to electric power supply from the high-voltage battery 32 to the low-voltage system circuit 40. If it is determined that the update-target device 44 is the certain device, the DC-DC converter 60 is caused to reduce in voltage the output electric power of the high-voltage battery 32 and to supply the electric power reduced in voltage to the low-voltage system circuit 40, so that the low-voltage battery 42 is charged. After the low-voltage battery 42 is charged, the certain device is caused to stop operating. The updater 46 is then caused to perform reprogramming of the certain device by using the output electric power of the low-voltage battery 42. Consequently, the likelihood of updating of a program being aborted because of a deficiency of electric power can be reduced, and reprogramming of the certain device relating to electric power supply from the high-voltage battery 32 to the low-voltage system circuit 40 can be performed.

If it is determined that the update-target device 44 is not the certain device, the DC-DC converter 60 is caused to reduce in voltage the output electric power of the high-voltage battery 32 and to supply the electric power reduced in voltage to the low-voltage system circuit 40, and the updater 46 is caused to update the program of the update-target device 44 by using the output electric power of the high-voltage battery 32. Consequently, if the update-target device 44 is not the certain device, charging of the low-voltage battery 42 is omitted. Thus, the time taken for reprogramming can be reduced.

As described above, the control device 22 determines whether the charge level of the low-voltage battery 42 is higher than or equal to the electric power level used for reprogramming of the update-target device 44. If the control device 22 determines that the charge level of the low-voltage battery 42 is not deficient relative to the electric power level used for reprogramming, the control device 22 causes the updater 46 to perform reprogramming of the certain device by using the output electric power of the low-voltage battery 42. On the other hand, if the control device 22 determines that the charge level of the low-voltage battery 42 is deficient relative to the electric power level used for reprogramming, the control device 22 determines whether the update-target device 44 is the certain device relating to electric power supply from the high-voltage battery 32 to the low-voltage system circuit 40. Thus, if the charge level of the low-voltage battery 42 is higher than or equal to the electric power level used for reprogramming of the update-target device 44, charging of the low-voltage battery 42 is omitted. Consequently, the time taken for reprogramming can be reduced.

The embodiment of the disclosure has been described above with reference to the accompanying drawings. It is needless to say that the disclosure is not limited to such an embodiment. It is obvious that a person skilled in the art can conceive various alterations and modifications within a scope of the claims. It is to be understood that these alterations and modifications are, of course, included in the technical scope of the disclosure.

In the embodiment described above, reprogramming is started upon the user's confirmation to perform reprogramming. However, the disclosure is not limited to this. For example, when the user confirms reprogramming, the user may designate any timing at which reprogramming is actually performed. In this case, when the current time reaches the timing set by the user, the updater 46 starts reprogramming. If reprogramming is not to be performed because the vehicle 1 is traveling or the like when the current time reaches the timing set by the user, the reprogramming confirmation screen 24a may be displayed again to ask for the user's confirmation after the vehicle 1 is stopped.

In the embodiment described above, in the case where the reprogramming information is received and reprogramming is scheduled, the high-voltage battery controller 32a changes the target SOC lower-limit value of the high-voltage battery 32 to a value (scheduled reprogramming preparation value) that is higher than the normal value and sets the SOC upper-limit value to the normal value. However, the disclosure is not limited to such an example. The high-voltage battery controller 32a may change the target SOC upper-limit value of the high-voltage battery 32 to a value that is higher than the normal value and also change the target SOC lower-limit value of the high-voltage battery 32 to a value (scheduled reprogramming preparation value) that is higher than the normal value.

In the embodiment described above, the case where the vehicle 1 is a parallel hybrid vehicle has been described. However, the disclosure is not limited to this. The disclosure is applicable to various vehicles such as an EV, a plug-in hybrid vehicle (PHEV), and a non-plug-in hybrid vehicle (hybrid vehicle).

The control device 22 illustrated in FIG. 1 and the updater 46 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 22 including the high-voltage battery controller 32a, the high-voltage relay controller 34a, the low-voltage battery controller 42a, the automotive navigation system controller 52a, the IG power supply controller 54a, and the DC-DC converter controller 60a and to perform all or a part of functions of the updater 46. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIGS. 1 and 2.

The invention claimed is:

1. A vehicle comprising:
a high-voltage system circuit comprising
a high-voltage battery;
a low-voltage system circuit comprising
a low-voltage battery having a lower output voltage than the high-voltage battery, and
an updater configured to update a program of an update-target device by using electric power supplied from the low-voltage battery or the high-voltage battery; a direct current (DC)-DC converter coupled between the high-voltage system circuit and the low-voltage system circuit and capable of reducing in voltage output electric power of the high-voltage battery and supplying the electric power reduced in voltage to the low-voltage system circuit;
a controller configured to control the high-voltage system circuit, the low-voltage system circuit, and the DC-DC converter,
wherein the controller is configured to:
determine whether the update-target device is a certain device relating to electric power supply from the high-voltage battery to the low-voltage system circuit;
in a case where the update-target device is the certain device, cause the DC-DC converter to reduce in voltage the output electric power of the high-voltage battery and to supply the electric power reduced in voltage to the low-voltage system circuit so as to charge the low-voltage battery, cause the certain device to stop operating after the low-voltage battery is charged, and cause the updater to update the program of the certain device by using the output electric power of the low-voltage battery, and
wherein the controller is configured to, in a case where the update-target device is not the certain device, cause the DC-DC converter to reduce in voltage the output electric power of the high-voltage battery and to supply the electric power reduced in voltage to the low-voltage system circuit, and cause the updater to update the program of the update-target device by using the output electric power of the high-voltage battery.

2. The vehicle according to claim 1, further comprising:
a wireless communication device configured to wirelessly communicate with an external device,
wherein the controller is configured to:
in a case where the wireless communication device receives update data for updating the program of the update-target device, calculate, based on information on the update data, electric power used for updating the program of the update-target device, and determine whether a charge level of the low-voltage battery is deficient relative to the calculated electric power;
in a case of determining that the charge level of the low-voltage battery is not deficient relative to the calculated electric power, cause the updater to update the program of the update-target device by using the output electric power of the low-voltage battery; and
in a case of determining that the charge level of the low-voltage battery is deficient relative to the calculated electric power, determine whether the update-target device is the certain device relating to electric power supply from the high-voltage battery to the low-voltage system circuit.

3. The vehicle according to claim 1,
wherein the controller comprises
a high-voltage battery controller configured to control the high-voltage battery, and
a DC-DC converter controller configured to control the DC-DC converter, and
wherein the certain device includes at least either one of the high-voltage battery controller and the DC-DC converter controller.

4. The vehicle according to claim 2,
wherein the controller comprises
a high-voltage battery controller configured to control the high-voltage battery, and
a DC-DC converter controller configured to control the DC-DC converter, and
wherein the certain device includes at least either one of the high-voltage battery controller and the DC-DC converter controller.

5. The vehicle according to claim 1, further comprising:
an engine configured to serve as a driving source for traveling; and
a motor coupled to the high-voltage battery and configured to serve as a driving source for traveling.

6. The vehicle according to claim 2, further comprising:
an engine configured to serve as a driving source for traveling; and
a motor coupled to the high-voltage battery and configured to serve as a driving source for traveling.

7. The vehicle according to claim 3, further comprising:
an engine configured to serve as a driving source for traveling; and
a motor coupled to the high-voltage battery and configured to serve as a driving source for traveling.

8. The vehicle according to claim 4, further comprising:
an engine configured to serve as a driving source for traveling; and
a motor coupled to the high-voltage battery and configured to serve as a driving source for traveling.

* * * * *